United States Patent
Braun et al.

(10) Patent No.: US 9,150,764 B2
(45) Date of Patent: *Oct. 6, 2015

(54) POLYURETHANE FOAM COMPOSITION

(75) Inventors: Robert G. Braun, New Lenox, IL (US); Jess M. Garcia, New Lenox, IL (US); Deborah A. Schutter, Minooka, IL (US)

(73) Assignee: Dow Global Technologies LLC, Midland, MI (US)

( * ) Notice: Subject to any disclaimer, the term of this patent is extended or adjusted under 35 U.S.C. 154(b) by 1453 days.

This patent is subject to a terminal disclaimer.

(21) Appl. No.: 11/545,675

(22) Filed: Oct. 10, 2006

(65) Prior Publication Data

US 2007/0054972 A1 Mar. 8, 2007

Related U.S. Application Data

(63) Continuation of application No. 11/001,967, filed on Dec. 2, 2004, now abandoned, which is a continuation of application No. 10/344,073, filed as application No. PCT/US01/24903 on Aug. 8, 2001, now Pat. No. 6,894,083.

(60) Provisional application No. 60/223,817, filed on Aug. 8, 2000.

(51) Int. Cl.
*C08G 18/28* (2006.01)
*C09K 3/10* (2006.01)
*C08G 18/12* (2006.01)
*C08G 18/20* (2006.01)
*C08G 18/40* (2006.01)
*C08G 18/48* (2006.01)
*C08G 101/00* (2006.01)
*C08L 83/00* (2006.01)

(52) U.S. Cl.
CPC ............. *C09K 3/1021* (2013.01); *C08G 18/12* (2013.01); *C08G 18/2081* (2013.01); *C08G 18/4018* (2013.01); *C08G 18/4812* (2013.01); *C08G 18/4816* (2013.01); *C08G 2101/00* (2013.01); *C08G 2101/0008* (2013.01); *C08G 2350/00* (2013.01); *C08L 83/00* (2013.01)

(58) Field of Classification Search
CPC .. C09K 3/1021; C08G 18/12; C08G 18/2081; C08G 18/307; C08G 18/4018; C08G 18/4812; C08G 18/4816; C08G 2101/00; C08G 2101/0008; C08G 2350/00; C08L 83/00
USPC ......... 521/125, 128, 129, 130, 131, 159, 170, 521/174, 176; 222/630, 631, 635
See application file for complete search history.

(56) References Cited

U.S. PATENT DOCUMENTS

| | | | |
|---|---|---|---|
| 3,920,587 A * | 11/1975 | Watkinson | ..... 521/111 |
| 4,038,239 A * | 7/1977 | Coyner et al. | ..... 524/872 |
| 4,204,373 A | 5/1980 | Davidson | |
| 4,258,140 A | 3/1981 | Horacek et al. | |
| 4,275,172 A | 6/1981 | Barth et al. | |
| 4,401,769 A | 8/1983 | Malwitz | |
| 4,430,840 A | 2/1984 | Malwitz | |
| 4,904,428 A | 2/1990 | West et al. | |
| 5,034,422 A | 7/1991 | Triolo et al. | |
| 5,573,137 A * | 11/1996 | Pauls | ..... 222/80 |
| 5,654,344 A | 8/1997 | Falke et al. | |
| 5,698,609 A | 12/1997 | Lockwood et al. | |
| 5,731,361 A * | 3/1998 | Horn et al. | ..... 521/137 |
| 5,851,458 A | 12/1998 | De Vos et al. | |
| 5,880,167 A * | 3/1999 | Krebs et al. | ..... 521/155 |
| 5,951,796 A | 9/1999 | Murray | |
| 6,051,622 A | 4/2000 | Kinkelaar et al. | |
| 6,130,268 A | 10/2000 | Murray | |
| 6,410,609 B1 | 6/2002 | Taylor et al. | |
| 6,894,083 B2 * | 5/2005 | Braun et al. | ..... 521/159 |

FOREIGN PATENT DOCUMENTS

CA 2221015 6/1998

* cited by examiner

Primary Examiner — John Cooney

(57) ABSTRACT

Single component compositions for making a moisture-cured polyurethane foam are disclosed. Foam produced from the compositions of the present invention produce very low foaming pressure due to their 60-95 percent open-cell content. After these compositions are applied and cure, they form a permanent seal around the perimeter of installed fenestration products.

13 Claims, 4 Drawing Sheets

POLYURETHANE FOAM COMPOSITION

The present invention relates generally to the field of foamable polyurethanes. More specifically, the invention relates to single component composition for producing a moisture cured polyurethane foam where the foam has from 60 percent to 95 percent open-cell content.

Polyurethane foams have been known for many years. These foams are useful and have found their way into many industries. Most polyurethane foams are inherently hydrophobic and therefore are useful as insulation in moist or wet environs. In addition, polyurethane foams are known to provide excellent air barriers and are often used as both sealants and adhesives.

One particularly useful application of polyurethane foams is in the door and window installation industry. The improper installation of fenestrations (for example, windows, doors, skylights, etc.) in homes and office buildings can result in extreme and quantifiable energy losses. It was discovered that foamable polyurethane systems, particularly single-component systems, could easily be directed into the rough opening gap (void space between the wall and the inserted fenestration) to insulate and create airtight seals. Generally such single-component systems are storage stable foamable mixtures, under pressure, of a polyurethane prepolymer, blowing agents and auxiliary components for producing a polyurethane foam.

As the polyurethane composition is dispensed from containers, it immediately expands to fill cavities, such as the gap formed between the window and the rough opening. The expansion of the composition exerts a force against the adjacent construction materials as it further expands and cures. So long as the construction materials are strong enough, the foaming pressures have virtually no perceptible effect. However, problems have been reported when expandable polyurethane foams have been used to install fenestrations, particularly window assemblies made from aluminum and vinyl components. In these fenestration constructions, the foams have been known to exert enough foaming pressure (outward force) to cause extensive distortion of, for example, the window frames along their perimeters. Such distortion can also be called deflection. The greater the foaming pressure, the greater the deflection that will occur along the length of the window frame. Many window manufacturers recommend that 1.59 mm (1/16" or 0.0625 inches) is the maximum allowable deflection per side for window framing materials. Any greater deflection will impact the window performance in terms of ease of opening. Deflection in excess of this value will make opening difficult and in severe cases will prevent the window from opening and may adversely affect the air seal and energy efficiency of the window.

Prior art foams have been shown to have foaming pressures in the range of from 11 to 23 kPa (1.6 to 3.4 psi) when measured in a simulated rough opening cavity, which can result in the deflection of a typical vinyl window beyond the manufacturer's recommendations.

Within an hour or so of dispensing the foam, the foam will expand an additional amount. It has been commonly believed that this "post dispensing expansion" is a type of foam expansion that produces enough force to cause fenestration frame deflection. Thus, the fenestration manufacturers have tended to prefer, and in some instances specify that only "minimally expanding" foam sealants are to be used to install windows and doors.

In many cases, frame deflection is due to human error, as too much foam is applied to the cavity space between the wall and the frame interior. Properly applied, the foams should not cause excessive deflection. However, there is a tendency to overfill or completely fill cavities, which results in fenestration frame deflection.

Single component polyurethane foam sealants still offer the best option in terms of a cost-effective, easily applied insulation material that is moisture resistant and provides an excellent air barrier. Therefore a dispensable, polyurethane foam sealant that can exert a predictable, and relatively low force on adjacent surfaces regardless of how it is applied, and that also will not deform window frames, is highly desirable.

The invention is the use of a single component foam composition to produce open cell polyurethane foam wherein the foaming pressure is less than 11 kPa (1.6 psi) when measured in a simulated rough-opening cavity. In another aspect, the invention is to a polyurethane foam produced from such a composition wherein the foam has an open cell content of from 60 to 90 percent.

The present invention is a single component foam forming composition comprising a mixture of
  (a) prepolymers containing free isocyanate groups in the range of 12 to 17 percent by weight, based on reactive components in the foamable composition, which is produced by reacting a polyisocyanate with a polyol blend comprising a first polyol that has functionality from 2 to 4 and having a molecular weight from 500 to 3000 and a second polyol that has a functionality of from 2 to 4 and a molecular weight of from 500 to 12,000 wherein the first to second polyol are present in a parts by weight ratio of form 1:6 to 1:2;
  (b) usual adjuvants for polyurethane foams; and
  (c) a blowing agent.

An additional embodiment of the present invention is the above composition wherein the composition further contains from 0.5 to 4 percent by weight of a poly siloxane polyoxyalkylene surfactant.

In a further embodiment, the present invention is to a single component polyurethane foam composition comprising a polyisocyanate, and a first and a second polyol (triols and/or diols) provided in a ratio of from 1:6 to 1:2, preferably from 1:5 to 1:2, and more preferably from 1:4 to 1:2. An excess of isocyanate is reacted with the polyol blend (which also contains additional components, such as catalysts, surfactants, and fire retardants) in the presence of a blowing agent to form a polyurethane prepolymer. When dispensed from the container, the frothed prepolymer reacts with atmospheric moisture to form an open cell foam having 60 percent to 95 percent open cells.

In accordance with a further embodiment, the present invention relates to a single component polyurethane foam composition comprising an aromatic polyisocyanate, preferably based on diphenylmethane diisocyanate (MDI) and most preferably a polymethylene polyphenyl isocyanate (PMDI), and a first and a second polyol provided in a ratio of from 1:6 to 1:2. The first polyol preferably has a molecular weight range of from 500 to 3000. The second polyol preferably has a molecular weight (MW) range of from 4000 to 12,000. The composition makes an open cell foam having from 60 percent to 95 percent open cells.

In an embodiment the first polyol is a triol and the second polyol is a diol. In another embodiment, the first and second polyols are triols. In yet another embodiment, the first polyol is a triol and the second polyol is a blend of diol and triol.

In yet a further embodiment, the present invention relates to a system and device for dispensing a composition for a moisture-cured single component polyurethane foam comprising a container containing a polyurethane prepolymer composition wherein the dispensed polyurethane prepolymer reacts with atmospheric moisture to form a polyurethane foam having from 60 percent to 95 percent open-cells.

In a another embodiment, the device of the present invention further comprises a dispenser of the straw-trigger/valve, or dispensing gun/valve type where the dispensing gun may include the addition of a straw tip extender.

The present invention also relates to a method for applying around a fenestration installation a polyurethane foam that expands, yet generates low forces on the fenestration assembly during foam application and curing. A polyurethane prepolymer composition is provided comprising a polyisocyanate and a polyol composition wherein the polyol has a functionality of from 2 to 4 and a molecular weight of 500 to 12,000 where the ratio of isocyanate to polyol is from 1:1.2 to 1:0.8 parts by weight based on reactive components in the foamable composition. A polyurethane prepolymer composition is provided comprising a polyisocyanate, a first polyol which is a 500 to 3000 MW triol; a second polyol which is a 4000 to 12000 MW diol or triol, said first and second polyol provided in a ratio of isocyanate to polyol blend of from 1:1.3 to 1:0.8, preferably from 1:1.2 to 1:0.7 parts by weight.

The isocyanate and polyol blends are introduced into a container that is then sealed with a valve in place. The container is then charged with a blowing agent that dissolves into the mixture and acts to pressurize the container and form the cell structure of the moisture-cured foam. An excess amount of isocyanate of the stoichiometric ratio of isocyanate-to-polyol (NCO:OH) is reacted to form a polyurethane prepolymer with from 12 percent to 17 percent free NCO, and preferably from 13 percent to 15 percent free NCO. Once the reaction is complete (usually about 24 hours), a dispenser is then attached to a valve on the container. Upon activating the valve the composition is released from the container and delivered through the dispenser. The prepolymer reacts with atmospheric moisture to form an open-cell polyurethane foam structure of 60 percent to 95 percent open-cells.

DETAILED DESCRIPTION OF THE INVENTION

Figure 1:
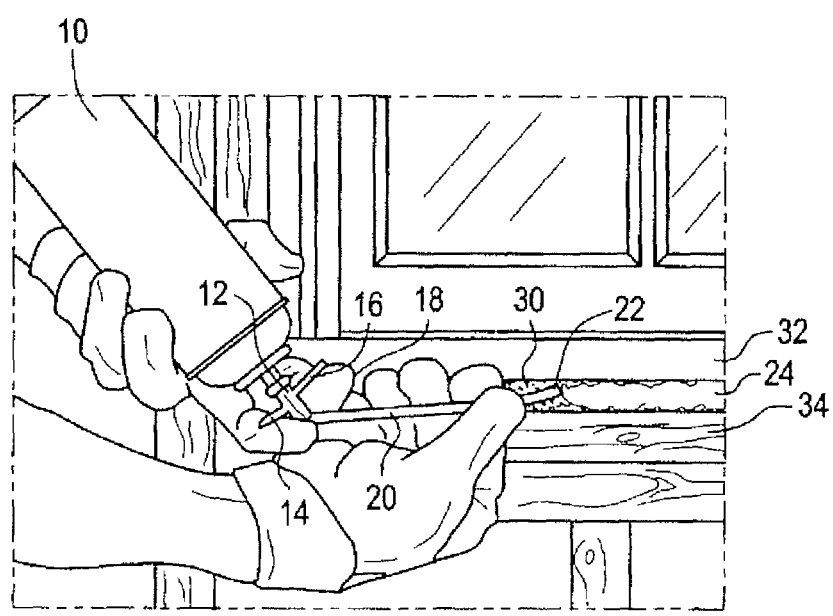
FIG. 1 shows the foam of the present invention dispensed into a rough opening gap between a window frame and a wall via a container and trigger-straw/valve dispenser representing one preferred embodiment.

According to the present invention, it has now been discovered that a moisture-cured single component polyurethane foam sealant, independent of the dispensing mechanism, can be employed usefully as a window sealant, having all of the desirable characteristics normally associated with such foams. In addition, the polyurethane foam of the present invention does not exert an excessive foaming force as it expands and cures. It has now been discovered that foam expansion in polyurethane foams does not necessarily directly relate to the foam's foaming force during cure. So long as the foam maintains an open-cell structure of from 60 percent to 95 percent open-cell, the foam performs equivalently to, or better than, known single component polyurethane foam sealants, with respect to foam expansion and air barrier characteristics, while exerting a much lower foaming force. This desirable combination of polyurethane foam properties results in greatly reduced fenestration frame deflection.

The high percentage open-cell character, along with the greater flexibility and resilience of the aerosol sealant foams of the present invention, are achieved by using surfactants normally associated with rigid form, high resilience molded foam or high resilience slab foam production and specifically structured polyols in specific proportions in combination with other components. In general, it has been recognized in the art that manufacturing any type of foam with high open cells is difficult. Processing variables can often lead to too high or too low an open cell content. This leads either to foam shrinkage (open cell content too low) or foam collapse or coarse cells (open cell content too high). According to one aspect of the present invention, the proper formulation ratio and polyol type to produce a 60 percent to 95 percent open-celled foam has been conclusively determined, and results in a foam that has an exceedingly low foaming pressure regardless of the selected dispensing method. In another aspect, the selection of the proper surfactant in the formulation will produce the 60 to 95 percent open cell content required.

Traditionally, expandable polyurethane sealant foams have been produced by dispensing single component foam compositions using straw/trigger assemblies and gun-like attachments with trigger mechanisms. The advantage of the gun mechanism is improved control of flow, greatly improved product "reuse", and instant shut off effected at the tip. This instant shut off eliminates post foam dripping after shut off that occurs with both the straw/trigger dispenser and the gun dispenser with an attached straw tip extender. Each of these dispensers is designed to attach to the aerosol valve of the container. Straw extenders are often used with the gun-like attachments to reach into areas that are difficult to access with the regular dispenser tip. Such extenders for the gun mimic the ability of the trigger straw assemblies to reach more difficult areas, and can extend the tip by about 5 cm. (2 in.) or more. The present inventors have appreciated that the use of extenders directly impacts the properties of the dispensed foam. For example, it has been appreciated that known single component compositions, when released through an extender, result in a dispensed foam having a greater wet density, as compared to the same foam being dispensed without an extender. It is known that the flow dynamics within the straw extender leads to a denser dispensed product. Therefore, the use of extenders causes more product to be dispensed into the same volume cavity. In addition, known foams dispensed via straw extenders display significantly greater forces, resulting in fenestration frame deflection compared to the same foam dispensed directly from the gun tip.

By contrast, the foams of the present invention exhibit foaming forces that remain relatively constant regardless of how they are dispensed; that is with or without straw tip extenders. This constancy is evidenced by the lack of resulting fenestration frame deflection. This predictable, low foaming force insures against the adverse effects of over-filling cavities, for example, in the window/door industry, which avoids the fenestration distortion and deflection problems described above. Therefore, the ability to use dispensing extenders allows the user to reach into cavities and installation spaces as desired without worrying about fenestration frame deflection.

The open-cell content of foams can be determined according to ASTM D2856-94, Vol. 08.02. The preferred foams of the present invention have an open-cell content of from 60 percent to 95 percent, more preferably from 75 percent to 95 percent, and most preferably from 85 percent to 95 percent.

In general, the process of the present invention uses variations of single component polyurethane chemistry. However, for the first time, the applicants recognized the relationship between the use of surfactants, and the molecular weights of polyols along with the required polyisocyanates, suitable catalysts, diluents, fire retardants and other additives, in controlling open cell formation to predictably achieve a foam useful for air barrier and sealant uses. In addition, the foams of the present invention do not generate potentially damaging forces to a fenestration assembly.

The polyols are caused to react with an excess polyisocyanate such that the prepolymers contain free isocyanate groups. Generally the prepolymers have an isocyanate content of 12 to 17 percent by weight, based on reactive components in the foamable composition. Preferably the prepolymers have an isocyanate content of 13 to 15 percent by weight of the prepolymer. The reaction between the polyol and isocyanate is normally effected in the temperature range up to 100° C., preferably at normal temperature to only moderately elevated temperatures.

Suitable organic polyisocyanates are the aliphatic, cycloaliphatic, aryliphatic and preferably aromatic polyisocyanates including, but not limited to alkylene diisocyanates having from 4 to 12 carbon atoms in the alkylene moiety, such as 1,12 dodecane diisocyanate, 2-methylpentamethylene 1,5-diisocyanate, tetramethylene 1,4-diisocyanate, hexamethylene 1,6-diisocyanate; cycloaliphatic diisocyanates such as cyclohexane 1,3- and 1,4-diisocyanate, 1-isocyanato-3,3,5-trimethyl-5-isocyanatomethylcyclohexane (isophorone diisocyanate), 2,4- and 2,6-hexahydrotoluene diisocyanate and the corresponding isomer mixtures 4,4'-, 2,2'- and 2,4'-dicyclohexylmethane diisocyanate and the corresponding isomer mixtures, and preferably aromatic diisocyanates and polyisocyanates such as 2,4- and 2,6-toluene diisocyanate and the corresponding isomer mixtures, 4,4'-, 2,4'- and 2,2'-diphenylmethane diisocyanates, polymethylene polyphenyl isocyanates, mixtures of 4,4'-, 2,4'- and 2,2'-diphenylmethane diisocyanates and polymethylene polyphenyl isocyanates (PMDI), and mixtures of the PMDI and toluene diisocyanates. Particularly preferred for inclusion with the triol and diol polyols mixture is polymethylene polyphenyl isocyanate.

The isocyanates may be modified as would be readily understood by those skilled in the field of polyurethane foam chemistry, so long as the selected isocyanates react with the polyol mix (approximately 1:4 ratio of triols to diols parts by weight) to create a final foam product that has 60 percent to 95 percent open cells. Preferably, the isocyanate is present in the final composition of the present invention in an amount of from 30 to 40 weight percent. Further, the isocyanate is present in a comparative ratio to the polyols in the range of from 7:1 to 14:1 NCO to OH equivalents, and preferably from 9:1 NCO to OH equivalents.

To achieve the open cell content of the present invention, it has been surprisingly found that surfactants generally used for making rigid closed cell foam in a two-component system will give the desired open cell content produced from the single component system. Useful surfactants include silicone type compounds commonly used in high resilience molded foam, high resilience slab stock foam and rigid type polyurethane foam formulations. In general such surfactant are the reaction product of a poly(alkyl siloxane), preferably a poly (dimethyl siloxane) compound and a poly(alkylene oxide) copolymer, where the alkylene oxides are ethylene oxide, propylene oxide or butylene oxide. Such surfactants are well known in the art, see for example Surfactant Science Ser. 86 (Silicone Surfactants), 137-158 (1999). For the present invention, the useful surfactants have a molecular weight of less than 30,000. Preferably the molecular weight is less than 20,000 and more preferably 15,000 or less.

An example of preferred surfactants are poly(dimethyl siloxane)polyoxyalkylene block copolymers of the general formula

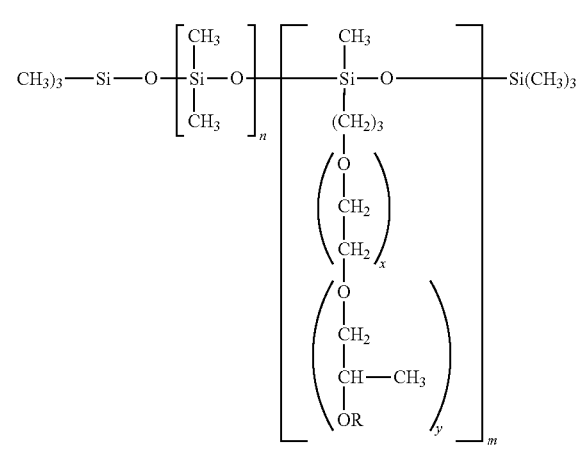

In this general formula n, m, x and y are integers which can assume a wide numeric range to give the desired molecular weight as described above. Preferably the surfactant has less than 50 siloxane units [(Si(CH2)-O] and the polyether chains are less than 1500 g/mol. The percent silicone oxide, copolymer content, etc. can be varied to affect the properties of the surfactant, see for example Silicone Surfactant Structural Requirements in Rigid Polyurethane Foams, Proceedings of The Society of the Plastics Industry, 474-478, 1983.

When added at the appropriate level in either the polyol blend or the reaction mixture, these surfactants will produce open cell foam instead of closed cell foams in combination with the polyol blend of the present invention. The surfactants provide stability to the foam's cell structure during dispensing, curing and the post-expansion processes, which occurs as a result of $CO_2$ generated by the reaction of the free isocyanate with atmospheric moisture. The surfactants further assist in the control of the open cell to closed cell ratio that, in turn, provides dimensional stability and affects the foaming pressure of the final cured foam Examples of commercially available surfactants suitable for use in the present invention include, those typically used in closed cell rigid foam applications such as DC 197, DC 193, B 8853, B 8462, B 8407, B 8404, L-5340, L-5420, L-6900; surfactants used for high resilience molded foam such as, DC 5164, DC 5169, B 8638, B 8681; and surfactants used for high resilience slab foam such as DC 5043, B 8707, and B 8681. The DC series of surfactants is available from Air Products, the B series is available from Goldschmidt and the L-series is available from OSI Specialties. Most preferred are the commercially available rigid type silicone surfactants. Most preferred are surfactants such as L-5340, L-5420, DC-197 and DC-193. The surfactants are present in the composition mixture of the present invention in an amount of from 0.5 to 4.0 parts by weight, preferably 1 to 3; and more preferably about 2 parts by weight.

The polyol composition is a polyether and/or polyester known for the production polyurethane elastomeric adhesives and sealants, rigid, semi-rigid and froth foams. The polyether/polyester polyols may also contain amine groups. The molecular weight of the polyol is between 500 and 12,000 number average molecular weight and a functionality of from 2 to 4, preferably from 2 to 3.

The polyols are produced by techniques known in the art. For example, suitable polyesters are produced from polycarboxylic acids and polyfunctional alcohols having from 2 to 12 carbons atoms. Examples of polycarboxylic acids include glutaric acid, succinic acid, adipic acid, sebacic acid, phthalic acid, isophthalic acid or terephthalic acid. Examples of polyfunctional alcohols include ethylene glycol, propanediol, butane, and hexane diol.

Polyether polyols can be obtained in conventional manners by reacting alkylene oxides, such as ethylene, propylene or butylene oxide, with an initiator having two active hydrogen atoms for a diol and with an initiator having three active hydrogen atoms for a triol. Examples of suitable initiators include ethylene glycol, diethylene glycol, propylene glycol, dipropylene glycol, tripropylene glycol, 1,4-butanediol, 1,6-hexane diol; cycloaliphatic diols such as 1,4-cyclohexane diol, glycerine, timethanoyl propane and triethanolamine. Catalysts for the polymerization can be either anionic or cationic with catalysts such as KOH, CsOH, boron trifluoride, or a double cyanide complex (DMC) catalysts such as zinc hexacyanocobaltate. Preferred polyols are those obtained using propylene oxide or a combination of propylene and ethylene oxide.

Preferably the polyol is a blend of a first and second polyether polyol. In one embodiment, the first polyol is one or more triols and second polyol is one or more diols that, combined, preferably have a secondary hydroxy functionality of at least about 50 percent. The triols preferably have a molecular weight (MW) range of from 500 to 3000 MW, more preferably from 600 to 2500 MW, and most preferably from 800 to 1500 MW. The diols preferably have a molecular weight range of from 4000 to 12,000 MW, preferably from 5000 to 10,000 MW, and most preferably from 6000 to 10,000 MW. Most preferably the triol is about a 1000 MW molecule and the diol is about an 8000 MW molecule.

In a second preferred embodiment, the second polyol is one or more triols having a secondary hydroxy functionality of at least about 50 percent and a molecular weight range from 4,000 to 12,000 MW, preferably from 5000 to 10,000 MW, and most preferably 6000 to 10,000 MW. More preferably, when the second polyol is a triol, such triol has a MW of about 9300.

In still another embodiment, the second polyol is combination of diol and triol as within the MW described above.

Preferably, the polyols are selected such that they are in a ratio of approximately 1:4 first polyol:second polyol. Most preferably, the first polyol is an hydroxy terminated poly(oxyalkylene) triol and the second polyol is an hydroxy terminated poly(oxyalkylene) diol or triol. In combination, the polyols preferably are present in the composition of the present invention in an amount of from 35 to 40 parts by weight.

The mixture further comprises a catalyst, such as an amine catalyst, to accelerate the reaction of the compounds in the mixture containing reactive hydrogen atoms and hydroxy groups. The preferred amine catalyst may comprise a primary, secondary or tertiary amine, with tertiary amine catalysts being particularly preferred. In addition to initiating the reaction between hydroxyl or active hydrogen and the isocyanate it is essential to accelerate the post moisture cure of the formulation to finished foam once the product is dispensed and used. Therefore many amine catalysts will be suitable, although tertiary amines are preferred including, but not limited to dimethylethanol amine (DMEA), tetramethyliminobispropyl amine (Polycat 15), N,N-dimethylcyclohexyl amine (DMCHA), tetraethylenediamine (Dabco/TEDA), etc. Other suitable compounds include organometallic compounds such as tin mercaptide, dibuyltin dilaurate (DBTDL), etc.

Most preferably, the amine catalyst is a dimorpholine compound such as dimorpholinopolyethylene glycol (PC Cat 1 KSC), 2,2'-dimorpholinodiethylether (DMDEE), with 2,2'-dimoropholinodiethylether being particularly preferred. The dimorpholine catalysts are preferably present in the compound of the present invention in an amount of from 0.45 to 0.90 parts by weight, and most preferably 0.55 to 0.7 parts by weight.

To make the polyurethane foam mixture of the present invention acceptable from a regulatory standpoint, for example, to be used as insulation with electronics, appliances or in conjunction with building materials, flame retardants are incorporated. Useful flame retardants include, without limitation, any compound with flame suppression properties that can be dissolved or dispersed in the polyurethane foam. These include compounds such as chlorinated or brominated phosphates, phosphonates, inorganic oxides and chlorides. Preferably, the flame retardant is a soluble liquid such as triethyl phosphonate, pentabromodiphenyl oxide, and most preferably is tri(1-methyl-2-chloroethyl)phosphonate. The flame retardants are preferably present in an amount of from 5 to 15 parts by weight.

The composition mixture may be formulated such that the foamed product may be made to cure to any useful color or shade as would be readily apparent to one skilled in the field of polyurethane foam formulations. For example, to create foam with color, colorants may be used.

Additional reactive components can be added to the composition such as silyl-terminated substances, which are compatible yet do not react in the can with the prepolymer polyurethane product. These, however, will also moisture cure independently once dispensed from the container thus producing an interpenetrating polymeric network. Such formulations have also been found to exhibit exceptional properties and suitable open cell contents.

A crosslinking agent or chain extender may be added, up to 5 percent by weight of the composition if necessary. The crosslinking agent or the chain extender includes low-molecular polyhydric alcohols such as ethylene glycol, diethylene glycol, 1,4-butanediol, and glycerin; low-molecular weight amine polyol such as diethanolamine and triethanolamine; polyamines such as ethylene diamine, xylenediamine and methylene-bis(o-chloroaniline). Also small quantities (less than 5 percent by weight) of any convention rigid foam polyol can be added to the composition to increase crosslinking and to modify the foam modulus.

Once the polyisocyanate and polyol blend are combined in the receptacle, usually a pressurizable container such as a metal aerosol can, the can is sealed with an aerosol valve prior to introducing a blowing agent. Useful blowing agents preferably include physical blowing agents. Such physical blowing agents are preferably gases that are inert toward the organic, modified or unmodified polyisocyanates. Such blowing agents preferably have high vapor pressures and boiling points typically below about 100° C., and most preferably from −50° C. to 30° C. at atmospheric pressure, so that they evaporate and form the cell structure after the foam is dispensed. Examples of suitable blowing agents includes alkanes, such as heptane, hexane and n- and isopentane, preferably technical grade mixtures of n- and isopentanes and n- and iso butane and propane, cyclohexane, cyclopentane; ethers, such as furan, dimethyl ether and diethyl ether; ketones, such as acetone and methyl ethyl ketone; alkyl carboxylates, such as methyl formate, dimethyl oxalate and ethyl acetate; and halogenated hydrocarbons, such as methylene chloride, dichloromonofluoromethane, difluoromethane, chlorodifluoromethanes, difluoroethane, tetrafluoroethane, chlorofluoroethanes, 1,1-dichloro-2,2,2-trifluoromethane, 2,2-dichloro-2-fluoroethane and hepafluoropropane, and mixtures thereof. Most preferred for the compositions of the present invention is an isobutane/propane/dimethyl ether mixture in combined amounts of from 11 to 16 parts by weight, and preferably about 13.2 parts by weight. The most preferred formulation is 67 to 70 parts by weight isobutane, 10 to 12 parts by weight propane, and 19 to 21 parts by weight dimethylether (DME).

The composition of the present invention is made by combining the polyols and additional compounds including an amine catalyst, a flame retardant, surfactants, and optional colorants into a premix. This polyol blend is added to the isocyanate. Finally an acceptable blowing agent is introduced to the mixture to aid in forming the cell structure of the foam The composition may be dispensed via any useful dispensing system. In one preferred embodiment of the present invention, the preferred polyurethane prepolymer is under pressure, such as, for example in a valved aerosol can. In a further preferred embodiment, the present invention relates to a preferred polyurethane prepolymer formulation in a valved aerosol can with a dispenser attached to the can for dispensing the polyurethane composition into a foamed state. According to the present invention, one preferred dispenser is of the type that is the subject of U.S. Pat. Nos. 6,032,830; 5,887,756; 5,615,804 and 5,549,228.

In a still further embodiment, the present invention contemplates adapting the dispenser with an extender. The extender is preferably an elongated cylindrical, straw-like attachment temporarily or permanently affixed to the end of the dispenser. The straw may be any useful length, preferably from 8 to 25 cm (3 to 10 inches) long.

The present invention now will be described more fully hereinafter with reference to the accompanying drawings. Like numbers refer to like elements throughout.

The single component polyurethane formulation of the present invention is contained within a container. A toggle valve-type trigger is fixedly attached to container. The trigger comprises flanges, which allow finger pressure to actuate the trigger mechanism. The finger pressure causes the toggle valve to open and release the pressurized polyurethane foam. The foam exits the container and proceeds through the dispenser, through the extender straw, and finally exits from the tip of extender as an expanding foam. The foam is directed into the fenestration rough opening gap between window frame and wall. A trigger/straw assembly may be used with a toggle valve.

The single component polyurethane formulation of the present invention may be contained within the container attached to a gun-type dispenser of the type that is the subject of U.S. Pat. No. 5,615,804 the entire contents of which are incorporated by reference herein. Pressure exerted by the operator's trigger finger dislodges an internal mechanism from a rest position and allows the polyurethane composition to release from the container, through a channel in dispenser, through the dispenser shaft, finally exiting the tip as an expanding foam. The foam is directed into the fenestration rough opening gap between window frame and wall.

The single component polyurethane formulation of the present invention may be contained within a container attached to a gun-type dispenser of the type that is the subject of U.S. Pat. Nos. 5,549,228 and 5,887,756 the entire contents of which are incorporated by reference herein. Pressure exerted by the operator's trigger finger dislodges an internal mechanism from a rest position and allows the polyurethane composition to release from the container, through a channel in dispenser, through the dispenser shaft, finally exiting the tip as an expanding foam. The foam is directed into the fenestration rough opening gap between window frame and wall. The rough opening gap must be filled during home construction with a sealant to keep air from passing through the assembly leading to drafts and a loss of energy in the form of heating and cooling. The polyurethane foam of the present invention is applied within this gap.

Figure 2:
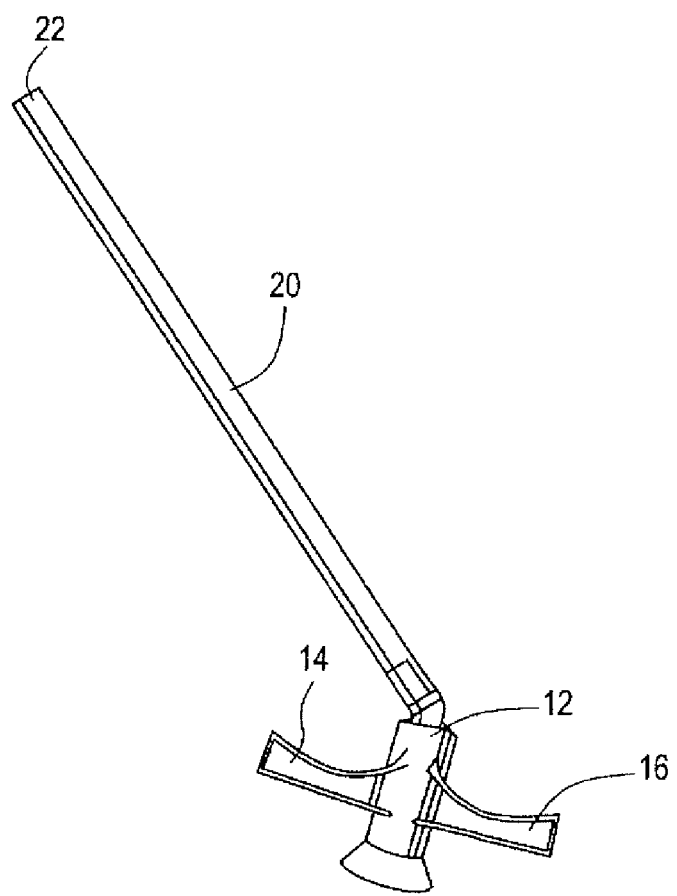
FIG. 2 is an enlarged view of one type of trigger-straw/valve dispenser of FIG. 1.

Referring now to the drawings in greater detail, FIG. 1 shows the single component polyurethane formulation of the present invention contained within container 10, toggle valve-type trigger 12 is fixedly attached to container 10. Trigger 12 comprises flanges 14, 16 which allow finger pressure to actuate the trigger mechanism. The finger pressure causes the toggle valve (not pictured) to open and release the pressurized polyurethane foam. The foam exits the container and proceeds through the dispenser 12, through the extender straw 20, and finally exits from the tip 22 of extender 20 as an expanding foam 24. The foam is shown directed into the fenestration rough opening gap 30 between window frame 32 and wall 34. FIG. 2 shows an enlarged view of one type of trigger/straw assembly that is used with a toggle valve.

Figure 3:
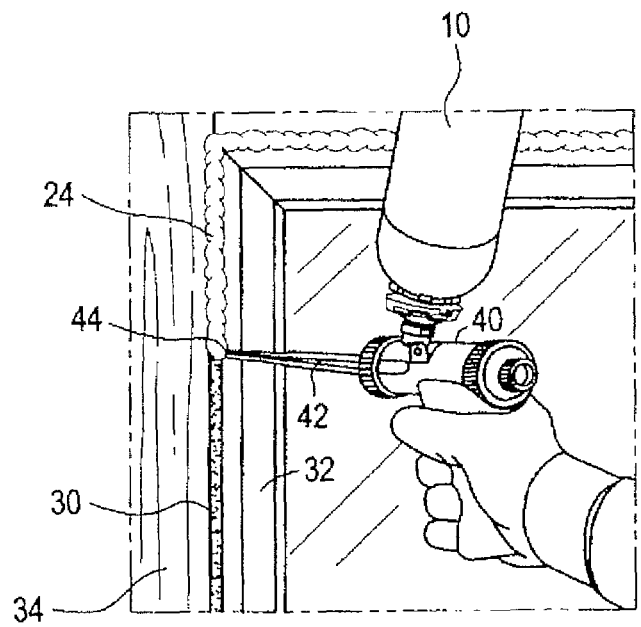
FIG. 3 shows the foam of the present invention dispensed into a rough opening between a window frame and a wall via a container and dispenser representing another preferred embodiment.

FIG. 3 shows the single component polyurethane formulation of the present invention contained within container 10 attached to a gun-type dispenser 40 of the type that is the subject of U.S. Pat. No. 5,615,804 the entire contents of which are incorporated by reference herein. Pressure exerted by the operator's trigger finger (not shown) dislodges an internal mechanism from a rest position and allows the polyurethane composition to release from the container 10, through a channel (not shown) in dispenser 40, through the dispenser shaft 42, finally exiting the tip 44 as an expanding foam 24. The foam is shown directed into the fenestration rough opening gap 30 between window frame 32 and wall 34.

Figure 4:
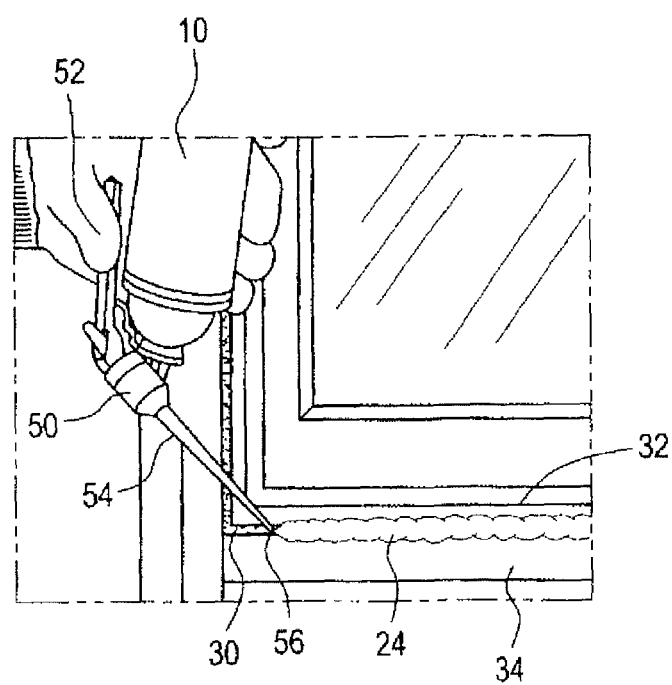
FIG. 4 shows the foam of the present invention dispensed into a rough opening between a window frame and a wall via a container and dispenser representing a further preferred embodiment.
Figure 5:
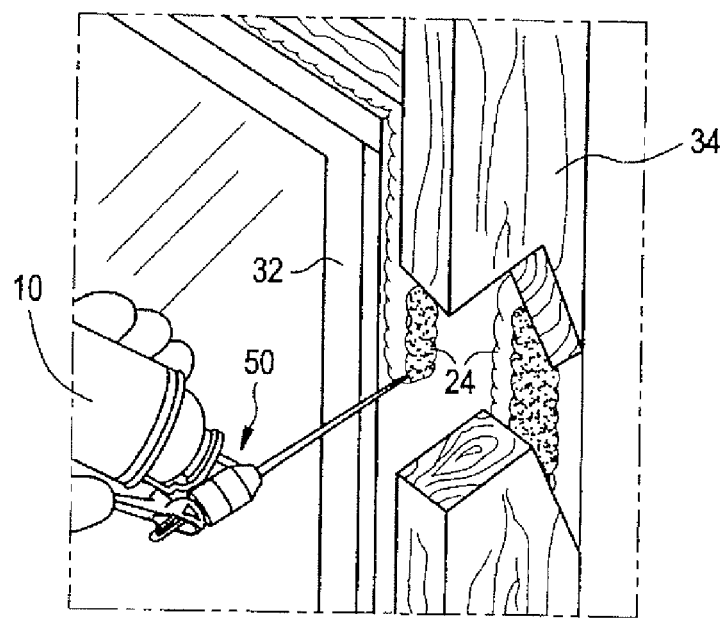
FIG. 5 shows a cut away view of the wall showing the foam of the present invention being applied to the rough opening gap between a window frame and a wall.

FIG. 4 shows the single component polyurethane formulation of the present invention contained within container 10 attached to a gun-type dispenser 50 of the type that is the subject of U.S. Pat. Nos. 5,549,228 and 5,887,756 the entire contents of which are incorporated by reference herein. Pressure exerted by the operator's trigger finger (shown as being the thumb) 52 dislodges an internal mechanism (not shown) from a rest position and allows the polyurethane composition to release from the container 10, through a channel (not shown) in dispenser 50, through the dispenser shaft 54, finally exiting the tip 56 as an expanding foam 24. The foam is shown directed into the fenestration rough opening gap 30 between window frame 32 and wall 34. FIG. 5 shows a cut away view of the expanding foam 24 being directed into rough opening gap 30. It is this rough opening gap 30 that must be filled during home construction with a sealant to keep air from passing through the assembly leading to drafts and a loss of energy in the form of heating and cooling. The polyurethane foam of the present invention is applied within this gap.

While the foams of the present invention find immediate and important utility, and in fact were developed with the building construction industry in mind, these foams display properties for the first time in a single component polyurethane open-celled foam of this type, and therefore find utility beyond the construction industry. For example, the foams of the present invention may be used wherever vibration or sound damping are desired, such as in the automotive industry (roof, door, engine compartment panels, etc.) or in the acoustic industry (for example, acoustic tiles and ceilings or walls, etc.). Indeed, the foams of the present invention may be used in the transportation industry to soundproof passenger or engine compartments of transportation craft, for example, of trains, cars, buses, planes, ships, etc. Further, the excellent air barrier characteristics coupled with the foams hydrophobicity, makes the foams excellent candidates to be used wherever insulation is required in a moist or wet environment (for example, appliances, wherever condensation or exposure to environmental moisture could occur, marine engine and boat manufacturing industries, etc.). The lack of attending foaming force in light of excellent expandability also makes the foams useful as insulation in the electronics industry. For the purposes of this application, the term electrical devices encompasses mechanical devices that, strictly speaking may not require electricity to run. Still further, the foams would be useful as resilient joints in the building industry with the foams interposed between joints in wood, metal, stone facings, concrete or mixtures thereof and expansion joints contained in these materials. Since the foam of the present invention has a greater resilience as compared with conventional moisture-cured single component foam sealants, the present foam exhibits a greater ability to expand and contract during joint movement without fracture or loss of adhesion. Thus, the foams of the present invention made by the compositions of the present invention tolerate greater flexing and movement due to forces such as, for example, wind load cycling. Recent testing has demonstrated that certain window perimeter joints had to be redesigned due to this type of failure when a conventional foam sealant was used.

The following examples serve to give specific illustrations of the present invention, but are not intended in any way to limit the scope of this invention. All percentages are given by weight unless otherwise noted.

EXAMPLE 1

A vessel was charged with a premix comprising 15.9 percent hydroxy terminated poly(oxyalkylene)polyol (1000 MW triol), 63.5 percent hydroxy terminated poly(oxyalkylene)polyol (8000 MW diol), 1.4 percent 2,2'-dimorpholinodiethylether (DMDEE) (amine catalyst), 15 percent tri(1-methyl-2-chloroethyl)phosphate (PCF) (fire retardant), 4.0 percent polyalkyleneoxidemethaylsiloxane copolymer (silicone surfactant), and 0.23 percent colorant.

The premix was provided in an amount of 49.6 percent to an aerosol can along with 37.2 percent polymethylene polyphenyl isocyanate (PMDI). A glass agitation ball was placed into the mixture in the can. An aerosol type valve was crimped onto the can. Isobutane/propane/dimethyl ether (IPDE) hydrocarbon blowing agent in an amount of 13.2 percent was charged to the can through the valve. The can was then thoroughly shaken and set into a box.

The polyurethane prepolymer prepared as described above had the following weight percentages:

| Formulation A | |
|---|---|
| Percent | Component |
| 37.8 | PMDI (Dow Chemical) |
| 7.8 | 1000 mw triol polyol |
| 31.3 | 8000 mw diol polyol |
| 0.69 | DMDEE (Huntsman) |
| 7.4 | PCF (Akzo Nobel) |
| 0.12 | Colorant |
| 2.2 | Silicone surfactant (L-5340, Witco) |
| 12.69 | Isobutane/Propane/DME |

The observed vinyl window frame deformation was approximately 0.04 cm (1/64 or 0.016 inch) for foam dispensed from the gun dispenser without the straw extension tip, approximately 0.08 cm (1/32 or 0.031 inch) for foam dispensed using the gun dispenser with the straw tip extender and approximately 0.05 cm (0.02 inch) for foam dispensed through a trigger/straw dispenser. (This test is explained in Example 3). The open cell content was about 88 percent for foam dispensed through a plastic dispensing gun without the straw tip extension, about 90 percent for foam dispensed through plastic dispensing gun with the straw tip, and about 72 percent open cells for foam dispensed through a trigger/straw dispenser. Finally the amount of air passing through the foam was determined to be about 0.01 L/s (0.02 cfm), for foam dispensed from the gun dispenser with or without the straw extension tip or from a trigger/straw dispenser using the method that is the subject of Example 2.

By comparison, the observed vinyl window frame deformation for a conventional one component foam (OCF) sealant, (Comparative 1) dispensed through a plastic dispensing gun without a straw extension tip was approximately 0.4 cm (0.16 inches) and approximately 0.54 cm (0.21 inch) using the plastic gun dispenser with a straw tip extension. The open cell content was about 23 percent without the straw tip and 14 percent with the straw tip. The amount of air passing through the foam was determined to be about 0.01 L/s (0.03 cfm). Other conventional OCF sealant, comparatives 2 and 3, dispensed through a trigger/straw applicator had an observed vinyl window frame deformation of approximately 0.59 cm (0.23 inch). The open cell content was about 15 percent. The amount of air passing through the foam was determined to be about 0.01 L/s (0.02 cfm). Table 1 below lists the tabulated characteristics of various formulations listed as comparative examples.

TABLE 1

| Formulation | Max. Deflection Cm (inches) | Percent Open Cell | Air Flow L/s (cfm) |
|---|---|---|---|
| **Formulation A through plastic gun w/o straw tip | 0.04 (0.02) | 88 percent | 0.01 (0.02) |
| **Formulation A through plastic gun w/straw tip | 0.08 (0.03) | 90 percent | 0.01 (0.01) |
| *Form. 1 through trigger/straw | 0.05 (0.02) | 72 percent | 0.01 (0.02) |

TABLE 1-continued

| Formulation | Max. Deflection Cm (inches) | Percent Open Cell | Air Flow L/s (cfm) |
|---|---|---|---|
| **OCF gun foam through plastic gun without straw tip (comparative 1) | 0.40 (0.16) | 23 percent | 0.01 (0.03) |
| **OCF gun foam through plastic gun with straw tip (comparative 1) | 0.54 (0.21) | 14 percent | 0.01 (0.03) |
| *OCF straw foam, comparative 2 | 0.58 | 13 percent | 0.01 (0.02) |
| *OCF straw foam, comparative 3 | 0.61 | 31 percent | 0.01 (0.03) |

Note:
* = 72" × 36" vinyl replacement window
** = 72" × 21" vinyl new construction window

EXAMPLE 2

Determination of Rate of Air Leak

This test consisted of sealing a test sample into or against one face of an air chamber, supplying air to or exhausting air from the chamber at the rate required to maintain the specified test pressure across the sample, and then measuring the resultant airflow through the specimen. Test jigs were cut into dimensions of 39"×3.5" with a 0.5" gap in between two pieces of wood. The test jigs were bonded together to produce a wood frame and provide a positive seal against the air barrier apparatus. The samples were prepared by placing an extender on a dispenser that is positioned to a point approximately halfway into the gap formed by the wood frame. The polyurethane foam was dispensed under pressure in a long, steady 36" continuous bead. The polyurethane foam bead prepared in the wood frame was dispensed in one to two passes. The filled wooden frame with the foam sample contained therein was set into the test chamber. The sample foam was tested in an untrimmed state. A controllable blower designed to provide the required airflow at the specified test pressure differences was provided. The differential test pressures were determined by an on-line manometer, and an airflow metering system measured the airflow into the test chamber, and through the sample. The sample was conditioned and allowed to cure at 73° F.+/−3° F. and 50 percent+/5 percent relative humidity for 24 hours prior to testing. The smooth face (side) of the sample was placed against the chamber opening. The sample jig was clamped down to secure the sample in place. The air flow meter was opened to the lowest range and the pressure was dialed down to 75 Pa on the manometer. Once the test conditions stabilized, the airflow through the sample was recorded in terms of cubic feet per minute (cfm). The tested samples of the present invention recorded air leak values of from 0.01 to 0.10 cfm at room temperature. The airflow was calculated directly from the meter, and yielded the results shown in Table 2. Values for convention OCF's as well as a conventional latex foam sealant and a fiberglass chinking sealant are given by way of comparison.

TABLE 2

| Formulation | Air Permeability L/s (cfm) |
|---|---|
| Formulation A through plastic gun w/no tip | 0.01 (0.02) |
| Formulation A through trigger/straw | 0.01 (0.02) |
| OCF Gun through plastic gun w/no tip (comparative 1) | 0.01 (0.03) |
| OCF straw foam sealant (comparative 2) | 0.01 (0.2) |
| Latex foam sealant (comparative) | 0.37 (0.78) |
| Fiberglass chinking, med. fill (comparative) | 0.8 (1.7) |
| Fiberglass chinking, dense fill (comparative) | 0.35 (0.74) |

EXAMPLE 3

Method of Determining Deflection of Window Frame Along Perimeter

This test consisted of measuring the extent of window frame deflection by measuring the force required to open the window. A structure (buck) was created to support the window and simulate the rough opening. The window was then installed per manufacturer instructions. The buck was marked at three levels of the window. The buck width was measured at three levels for initial outer buck width values. At the same mark, but within the window jamb, the distance between the inner window jambs is marked and measured to the nearest 0.158 cm (1/16"). To measure the bottom distance, the window was opened to a set height and the distance was measured. A total of six (6) rough opening gap measurements were made (three each on the two longest sides of the window) at the three established levels. The three levels are set at one-third, one-half, and two-thirds the length of the longest window side. Measurements were made to 0.01" (0.0254 cm); three along the right side and three along the left. With the window sash in the down (closed) position, five (5) force measurements were made by pulling the window up to determine "breaking force" and the range of low and high "operating force". With the window up, the sash was pushed down five times with the breaking and operating forces recorded before and after the other test measurements to insure the buck is dimensionally stable throughout the test. Prior to foaming the window, the product, lab book or batch, dispenser type, product, temperature and relative humidity are recorded. The foam was dispensed in the following manner: up the left side and across the top, across the bottom and up the right side. After 24 hours, the buck width, inner window jamb, and operating force, both up and down, are re-measured to determine the deflection and operating force caused by the foam. The percent difference from "initial" and "final" values were determined. Note: differences greater than 0.1587 cm (0.0625"), and force measurements greater than 133N (30 lbf) represent values considered to be minimum values above which determine failure. See Table 3.

TABLE 3

| Formulation and dispenser | Max. Deflection Cm(inch) | Max. Operating Force Before/After Foaming |
|---|---|---|
| *Formulation A through plastic gun | 0.01 cm (0.04") | 89N(20 lbf) 89 N (20 lbf) |
| *Formulation A through trigger/straw | 0.05 cm (0.02") | 85N(19 lbf)/85N (19 lbf) |
| *OCF Straw foam sealant (comparative 2) | 0.58 cm (0.23") | 75N(17 lbf)/156N (35 lbf) |
| *OCF Straw foam sealant (comparative 3) | 0.61 cm (0.24") | 75N(17 lbf)/182N (41 lbf) |

Note:
* = 72" × 36" vinyl replacement window
** = 72" × 21" vinyl new construction window

EXAMPLE 4

A vessel was charged with a premix comprising 167 percent hydroxy terminated poly(oxyalkylene)polyol (1000 MW triol; 30-168 from Arch), 66.9 percent hydroxy terminated poly(oxyalkylene)polyol (9300 MW triol; from Arch), 1.2 percent 2,2'-dimorpholinodiethylether (DMDEE) (amine catalyst from Huntsman), 13.0 percent tri(1-methyl-2-chloroethyl)phosphate (PCF) (fire retardant from Akzo Nobel)), 2.0 percent silicone surfactant (L-5340 from Witco), and 0.2 percent colorant from Millikin.

The premix was provided in an amount of 48.2 percent by wt. (of the final formulation) to an aerosol can along with 38.6 percent polymethylene polyphenyl isocyanate (PMDI). A glass agitation ball was placed into the mixture in the can. An aerosol type valve was crimped onto the can. Isobutane/propane/dimethyl ether (IPDE) hydrocarbon blowing agent in an amount of 13.2 percent by wt. was charged to the can through the valve. The can was then thoroughly shaken and set into a box.

The open cell content was about 83 percent for foam dispensed through a trigger/straw applicator.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A polyurethane foam forming composition delivery system comprising:
   a container;
   a pressurized single component polyurethane foam forming composition comprising a mixture of (a) prepolymers containing free isocyanate groups in the range of 12 to 17 percent by weight, based on the prepolymer, which is produced by reacting a polyisocyanate with a polyol blend comprising a first polyol that is a triol having a molecular weight of in the range of from 600 to 2500 and a second polyol that is a diol, triol, or mixtures thereof having a molecular weight in the range of from 6000 to 10,000, wherein the first polyol and the second polyol are present in a parts by weight ratio in the of from 1:6 to 1:2; (b) a blowing agent; and (c) from 0.5 to 4 percent by weight a surfactant comprising the reaction product of a poly(alkyl siloxane) and a poly(alkylene oxide) copolymer, where the alkylene oxide are ethylene oxide, propylene oxide or butylene oxide, based on the total weight of the single component polyurethane foam forming composition, and
   means for dispensing said pressurized single component polyurethane foam forming composition, wherein said polyurethane foam forming composition forms an open-cell structure foam having open cells in the range of from 60% to 95%.

2. The polyurethane foam forming composition delivery system of claim 1, wherein the means for dispensing is a dispenser is a straw-trigger/valve dispenser or a gun/valve disperser.

3. The polyurethane foam forming composition delivery system of claim 1, wherein the single component polyurethane foam forming composition further comprises from 0.5 to 4 percent by weight, based on the total weight of the single component polyurethane foam forming composition, of a polydimethyl siloxane polyoxyalkylene copolymer surfactant.

4. The polyurethane foam forming composition delivery system of claim 3, wherein the surfactant comprises 1 to 3 percent by weight of the single component polyurethane foam forming composition.

5. The polyurethane foam forming composition delivery system of claim 4, wherein the surfactant has a molecular weight of less than 30,000.

6. The polyurethane foam forming composition delivery system of claim 1, wherein the polyisocyanate in the single component polyurethane foam forming composition is selected from the group consisting of aliphatic, cycloaliphatic, aryliphatic, and aromatic polyisocyanates.

7. The polyurethane foam forming composition delivery system of claim 6, wherein the polyisocyanate is an aromatic polyisocyanate selected from diphenylmethane diisocyanate, polyphenyl polymethylene isocyanate or a combination thereof.

8. The polyurethane foam forming composition delivery system of claim 1, wherein the blowing agent is a hydrocarbon, a fluorocarbon, a chlorocarbon, a chlorofluorocarbon or a mixture thereof.

9. The polyurethane foam forming composition delivery system of claim 8, wherein the blowing agent is a hydrocarbon selected from isobutane, propane, dimethylether or a mixtures thereof.

10. The polyurethane foam forming composition delivery system 1, wherein the composition contains additional auxiliary agent selected from amine catalysts, tin catalysts or flame retardants.

11. The polyurethane foam forming composition delivery system 1, wherein the triols and diols in the single component polyurethane foam forming composition together comprise a secondary hydroxyl functionality of at least about 50 percent.

12. The polyurethane foam forming composition delivery system 4, wherein the second polyol in the single component polyurethane foam forming composition is a diol.

13. The polyurethane foam forming composition delivery system 4, wherein the second polyol in the composition is a triol.

* * * * *